US009648886B2

(12) United States Patent
Vonk et al.

(10) Patent No.: US 9,648,886 B2
(45) Date of Patent: May 16, 2017

(54) METHOD AND APPARATUS FOR HARVESTING OF BACKMEAT OF A CARCASS OR CARCASS PART OF SLAUGHTERED POULTRY

(75) Inventors: Pieter Willem Vonk, Oostzaan (NL); Ferdinand Allard De Vos, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 440 days.

(21) Appl. No.: 13/407,336

(22) Filed: Feb. 28, 2012

(65) Prior Publication Data
US 2012/0225184 A1 Sep. 6, 2012

(30) Foreign Application Priority Data

Feb. 28, 2011 (NL) ...................................... 2006313

(51) Int. Cl.
*A22C 17/02* (2006.01)
*A22C 21/00* (2006.01)
*A22B 5/00* (2006.01)

(52) U.S. Cl.
CPC ........ *A22C 21/0069* (2013.01); *A22B 5/0029* (2013.01); *A22C 17/02* (2013.01)

(58) Field of Classification Search
CPC ... A22B 5/0017; A22B 5/0029; A22B 5/0035; A22B 5/0041; A22C 17/0006; A22C 17/004; A22C 17/02; A22C 21/00; A22C 21/0023; A22C 21/003; A22C 21/0069
USPC .................. 452/135, 136, 150, 165
See application file for complete search history.

(56) References Cited

U.S. PATENT DOCUMENTS

| 4,648,156 | A | | 3/1987 | Meyn |
|---|---|---|---|---|
| 4,682,386 | A | | 7/1987 | Hazenbroek et al. |
| 4,688,297 | A | | 8/1987 | Bartels |
| 4,827,570 | A | | 5/1989 | Scheier et al. |
| 4,993,114 | A | | 2/1991 | Meyer et al. |
| 5,026,318 | A | * | 6/1991 | Jahnke .......................... 452/116 |
| 5,035,673 | A | * | 7/1991 | Hazenbroek ....... A22C 21/0023 452/149 |
| 5,098,337 | A | | 3/1992 | Landt et al. |
| 5,269,722 | A | | 12/1993 | Diesing et al. |
| 5,314,374 | A | * | 5/1994 | Koch et al. .................... 452/136 |
| 5,368,520 | A | * | 11/1994 | Koch et al. .................... 452/165 |

(Continued)

FOREIGN PATENT DOCUMENTS

DE  41 05 564 A1  8/1992
EP  0 591 741 A1  4/1994
(Continued)

OTHER PUBLICATIONS

Search report for NL2006313, dated Sep. 21, 2011.

*Primary Examiner* — David Parsley
(74) *Attorney, Agent, or Firm* — Dority & Manning, P.A.

(57) ABSTRACT

A method and apparatus for harvesting of backmeat of a carcass or carcass part of slaughtered poultry in connection with a process of filleting of the carcass or carcass part is provided. The method can include scraping the backmeat loose from the carcass or carcass part whereby a connection is maintained with fillets of the carcass or carcass part. Prior to the filleting of the carcass or carcass part a neck portion of a backbone of the carcass or carcass parts is fixed in position, whereby thereafter the backmeat is scraped loose from the carcass or carcass part.

15 Claims, 7 Drawing Sheets

(56) References Cited

U.S. PATENT DOCUMENTS

| | | | |
|---|---|---|---|
| 5,372,539 A | | 12/1994 | Kunig et al. |
| 5,569,067 A | * | 10/1996 | Meyn ..................... A22C 21/06 |
| | | | 452/106 |
| 5,643,074 A | * | 7/1997 | Linnenbank .................. 452/165 |
| 5,697,837 A | * | 12/1997 | Verrijp et al. ................ 452/170 |
| 5,827,116 A | * | 10/1998 | Al et al. ........................ 452/170 |
| 5,833,527 A | | 11/1998 | Hazenbroek et al. |
| 6,007,416 A | * | 12/1999 | Janssen et al. ............... 452/135 |
| 6,280,311 B1 | | 8/2001 | Kuck |
| 7,344,437 B2 | | 3/2008 | Van Den Nieuwelaar et al. |
| 7,357,707 B2 | * | 4/2008 | de Vos et al. ................ 452/136 |
| 2009/0170417 A1 | | 7/2009 | Janssen et al. |

FOREIGN PATENT DOCUMENTS

| | | |
|---|---|---|
| EP | 0 695 506 A2 | 2/1996 |
| EP | 0 756826 A2 | 2/1997 |
| EP | 1 346 639 A1 | 9/2003 |
| EP | 1 574 133 A1 | 9/2005 |
| EP | 1 454 531 B1 | 5/2007 |
| WO | WO 2007/067052 | 6/2007 |

* cited by examiner

METHOD AND APPARATUS FOR HARVESTING OF BACKMEAT OF A CARCASS OR CARCASS PART OF SLAUGHTERED POULTRY

FIELD OF THE INVENTION

The invention relates to a method and apparatus for harvesting of backmeat of a carcass or carcass part of slaughtered poultry in connection with a process of filleting of the carcass or carcass part, including scraping the backmeat loose from the carcass or carcass part, whereby a connection is maintained with the fillets of the carcass or carcass part.

BACKGROUND OF THE INVENTION

A previous method and apparatus for harvesting of backmeat of a carcass or carcass part of slaughtered poultry is indicated in U.S. Pat. No. 7,344,437.

According to the prior art, the known method and apparatus are embodied such that first of all two long incisions are made in the backmeat, substantially parallel to and on either side of the backbone. These incisions can be made, for example, using rotating blades. When making these incisions, it is preferable to prevent bone parts of the body of the carcass or carcass part from being touched by the blades because such would result in undesirable bone splinters in the meat.

The method and apparatus according to the prior art is disadvantageous in that it requires incisions to be made prior to the filleting of the carcass or carcass part, which is cumbersome and leads to higher processing costs. Furthermore, an even more serious disadvantage is that due to variations in the dimensions of the carcass or carcass parts, the operation of the rotating blades cannot be performed sufficiently accurate to ensure that bone splinters can always be avoided. This has a detrimental effect on the quality and value of the meat that is harvested with the method and apparatus known from U.S. Pat. No. 7,344,437.

It is an object of the invention to improve the methods and apparatus that is known from the prior art, to simplify the harvesting of backmeat of poultry, to reduce costs in the harvesting of the backmeat, and to increase the quality of the harvested meat.

These and other objects of the invention, which may become apparent from the following disclosure, are at least in part attained with the method and apparatus according to one or more of the appended claims.

SUMMARY OF THE INVENTION

Aspects and advantages of the invention will be set forth in part in the following description, or may be obvious from the description, or may be learned through practice of the invention.

In a first aspect of the invention, prior to the filleting of the carcass or carcass part, a neck portion of a backbone of the carcass or carcass part is fixed in position, whereafter the backmeat is scraped loose from the carcass or carcass part. Surprisingly this simple measure, which was never suggested before, suffices to execute a reliable separation of the backmeat from the carcass or carcass part while maintaining this meat's connection with the remainder of the meat so as to allow a complete harvesting of fillet meat, including the backmeat, in a subsequent filleting operation.

Clearly in the method of the invention it is preferred that the backmeat is scraped loose from the carcass or carcass parts while avoiding preparatory incision-making in the backmeat of the carcass or carcass part.

The method according to the invention is beneficially realized such that the fixing of the neck portion and the scraping of the backbone is executed with fixing means and scraping means that operate attuned to each other.

Advantageously, following the fixing of the neck portion of the backbone of the carcass or carcass part in position, the scraping loose of the backmeat is performed by a scraping action along the scapula in a region between the scapula and the backbone of the carcass or carcass part, and starting from the neck portion of the backbone. This has proved very effective in harvesting the backmeat to the fullest possible extent while ensuring that damage to the scapula is totally avoided.

In a certain embodiment, it is preferred that scraping of the backmeat along the scapula is executed until the scapula breaks at the wing joint to which it connects in its natural position. This provides the advantage that the backmeat can be harvested while it is still connected with the scapula, yet is loosened from the fillets. This way it can be harvested and sold as a product separate from the fillets, whereby it forms an integral part with the scapula. The portion of the scapula then sticking out of the backmeat provides an easy means for the consumer for handling the backmeat after it has been cooked.

The invention is also embodied in an apparatus for harvesting of backmeat of a carcass or carcass part of slaughtered poultry, including a scraper for scraping the backmeat loose from the carcass or carcass part whereby a connection is maintained with the fillets of the carcass or carcass part. According to the invention, the apparatus has fixing means for fixing a neck portion of a backbone of the carcass or carcass part in position, while the scraper is operative for scraping the backmeat loose from the carcass or carcass part. To promote this purpose, the fixing means and the scraper are preferably arranged to operate attuned to each other.

Desirably further, the scraper is arranged to execute a scraping action along the scapula in a region between the scapula and the backbone of the carcass or carcass part, starting from the neck portion of the backbone. As already mentioned above, this has proved very effective in harvesting the backmeat to the fullest possible extent, while ensuring that damage to the scapula is totally avoided.

In another embodiment of the apparatus of the invention, the scraper is arranged to execute scraping of the backmeat along the scapula until the scapula breaks at its corresponding wing joint. This surprisingly results in a novel chicken product, wherein the backmeat forms an integral part with the scapula. The invention is also embodied in this product, which is known under the names fifth and sixth wing.

The effective operation of the apparatus according to exemplary embodiments of the invention is promoted by arranging that the fixing means are executed as adjacent fixing plates that occupy a mutual distance in the region of 7-15 millimeters, each of the plates having rough edges at their sides facing the neck portion of the carcass or carcass part. These features arrange that the apparatus of the invention can be effectively applied with poultry of any practical dimension.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

In the drawings.

Whenever in the figures the same reference numerals are applied, these numerals refer to the same parts.

DETAILED DESCRIPTION OF THE INVENTION

Figures 1A, 1B:
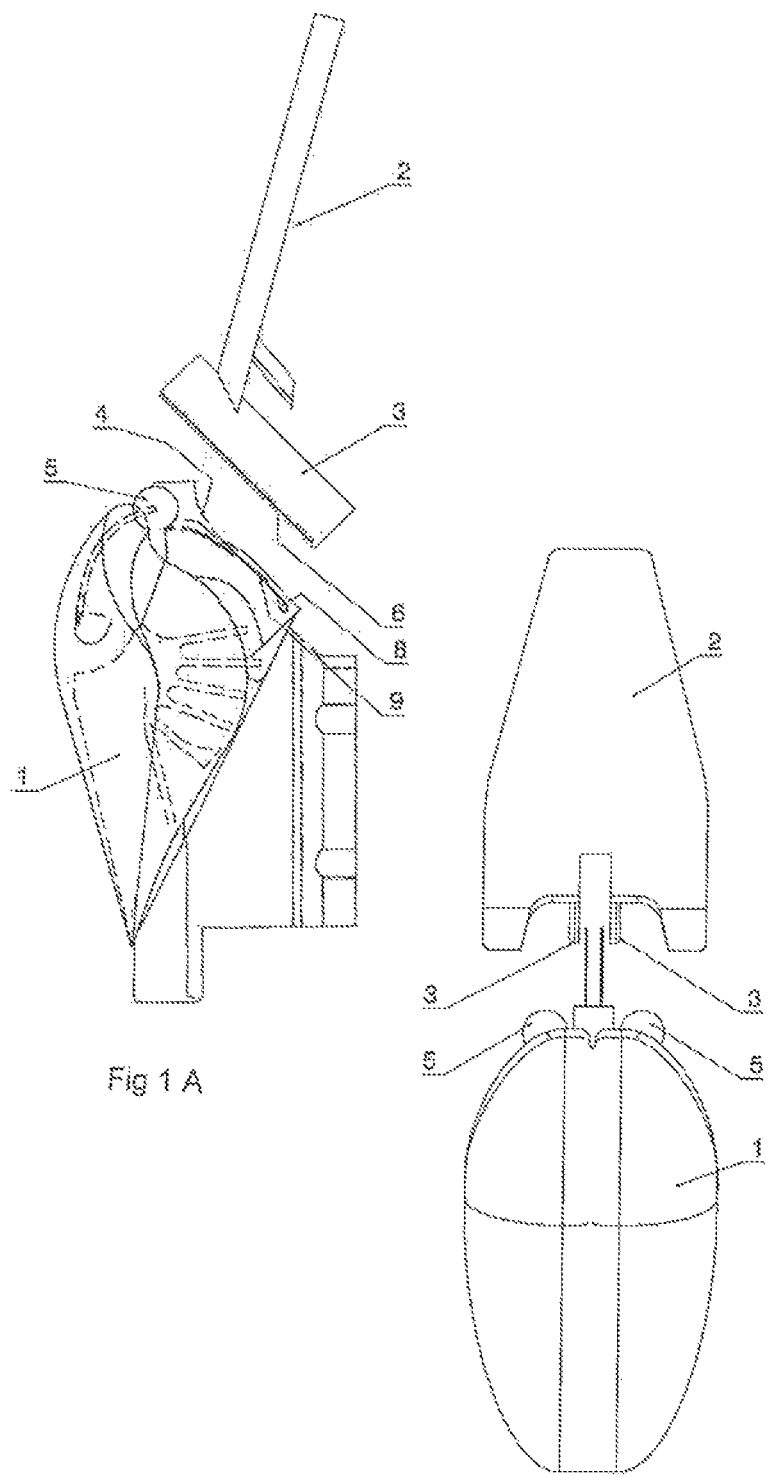
FIG. 1A and FIG. 1B schematically show a first step of an exemplary method executed with an exemplary apparatus of the invention in a side and a frontal view respectively.

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

With reference to the figures, the carcass or carcass part is indicated with reference 1.

In an exemplary method, the invention employs an exemplary apparatus having a scraper 2 for scraping the backmeat loose from the carcass or carcass part 1, whereby a connection is maintained with fillets of the carcass or carcass part.

The exemplary apparatus further has to that end fixing means 3 for fixing a neck portion 4 of a backbone of the carcass or carcass part 1 in position.

Figures 2A, 2B:
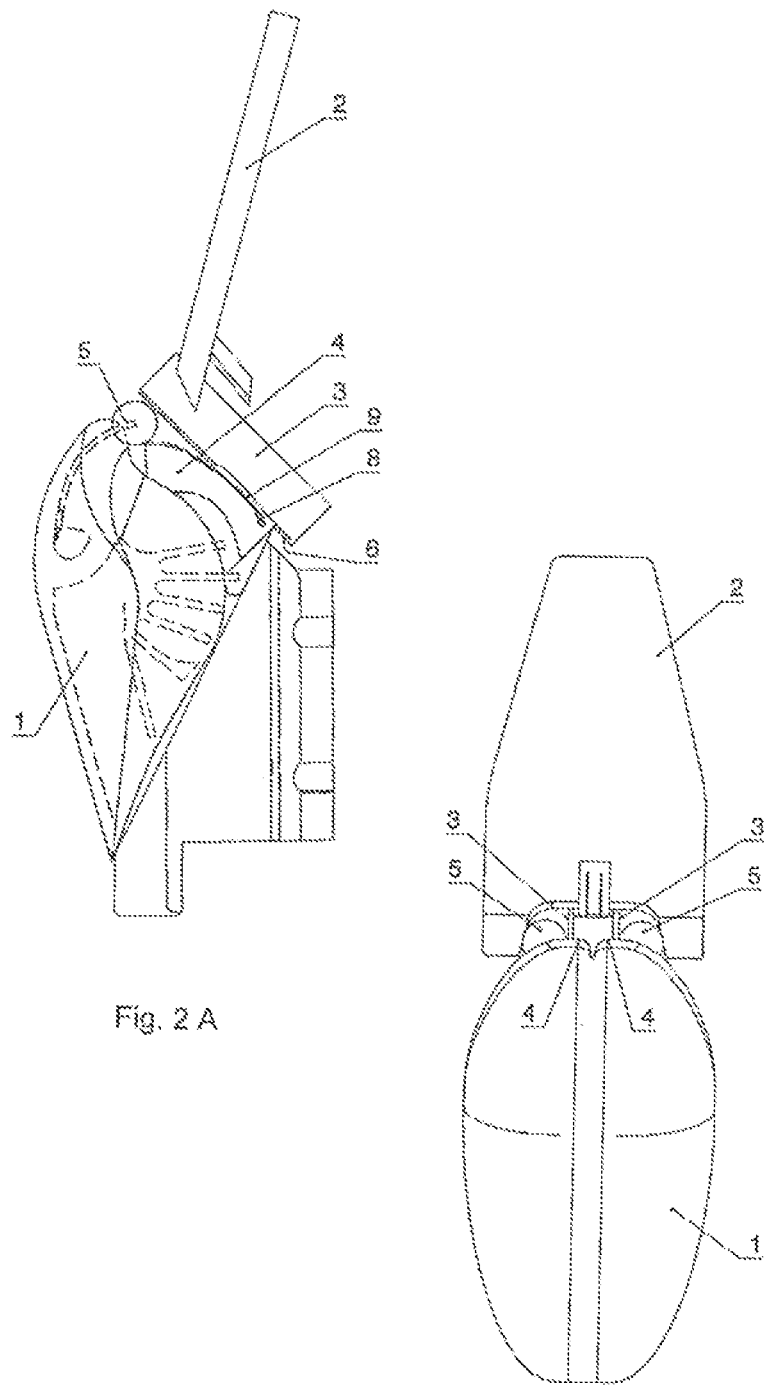
FIG. 2A and FIG. 2B schematically show a second step of the exemplary method executed with the exemplary apparatus of the invention in a side and a frontal view respectively.
Figure 3:
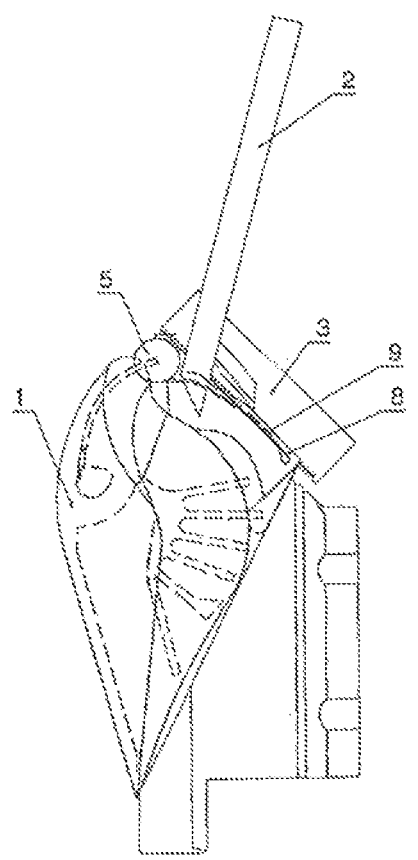
FIG. 3A and FIG. 3B schematically show a third step of the exemplary method executed with the exemplary apparatus of the invention in a side and a frontal view respectively.
Figure 3:
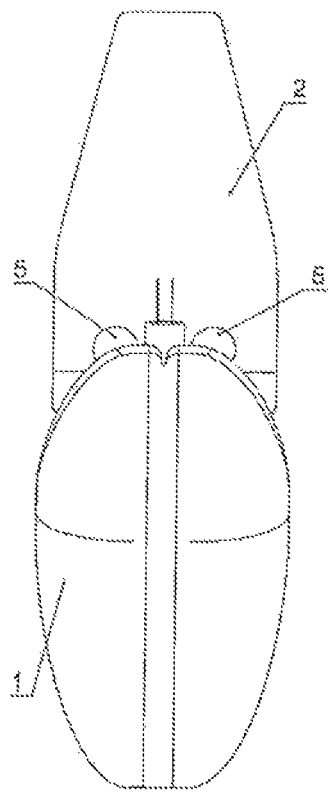

FIG. 1A and FIG. 1B show the scraper 2 and the fixing means 3 prior to their operation on the carcass part 1. FIG. 2A and FIG. 2B in turn show the situation when the fixing means 3 have come to act on the neck portion 4 of the backbone of the carcass part 1, and FIG. 3A and FIG. 3B show the subsequent situation when the neck portion 4 of the carcass' backbone is maintained in position by the fixing means 3 and the scraper 2 engages the carcass part 1 for scraping the backmeat loose from the carcass or carcass part 1. Accordingly, FIGS. 1-3 show that the fixing means 3 and the scraper 2 are arranged to operate attuned to each other.

In a first exemplary embodiment of the apparatus of the invention, the scraper 2 is arranged to execute a scraping action along the scapula in a region between the scapula and the backbone of the carcass or carcass part 1, starting from the neck portion 4 of the backbone near to the wing joint 5 to which the scapula connects, as is shown in FIG. 3A and FIG. 3B. The end position of the scraper 2 after executing this scraping action is shown in a side view in FIG. 4.

Albeit superfluously, it is remarked that the position of the scapula in relation to the backbone is well known to the person skilled in the art and, therefore, such requires no further elucidation with reference to the figures.

Figure 6:
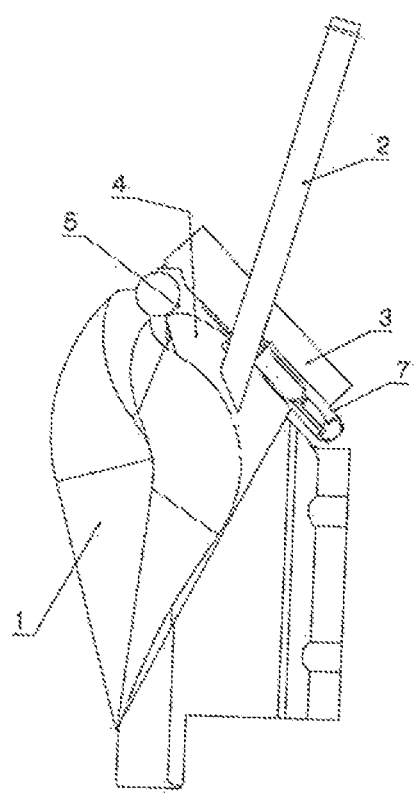
FIG. 6 schematically shows a third step of a different embodiment of an exemplary method executed with the exemplary apparatus of the invention.

In another embodiment of the apparatus arranged to execute an alternative exemplary method of the invention, the scraper 2 is arranged to execute scraping of the backmeat along the scapula until the scapula breaks at its corresponding wing joint 5. This is schematically shown in FIG. 6, which demonstrates that for this purpose the scraper 2 ultimately arrives at a sufficiently deeper position within the carcass or carcass part 1.

Figure 4:
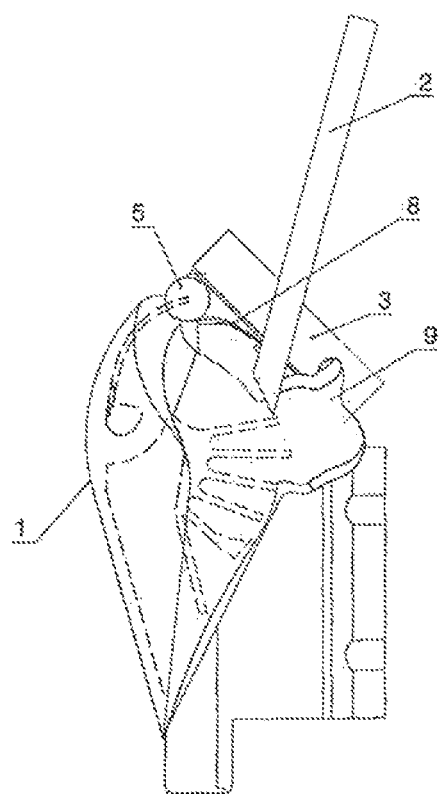
FIG. 4 schematically shows a fourth step of the exemplary method executed with the exemplary apparatus of the invention in a side view.
Figures 5A, 5B:
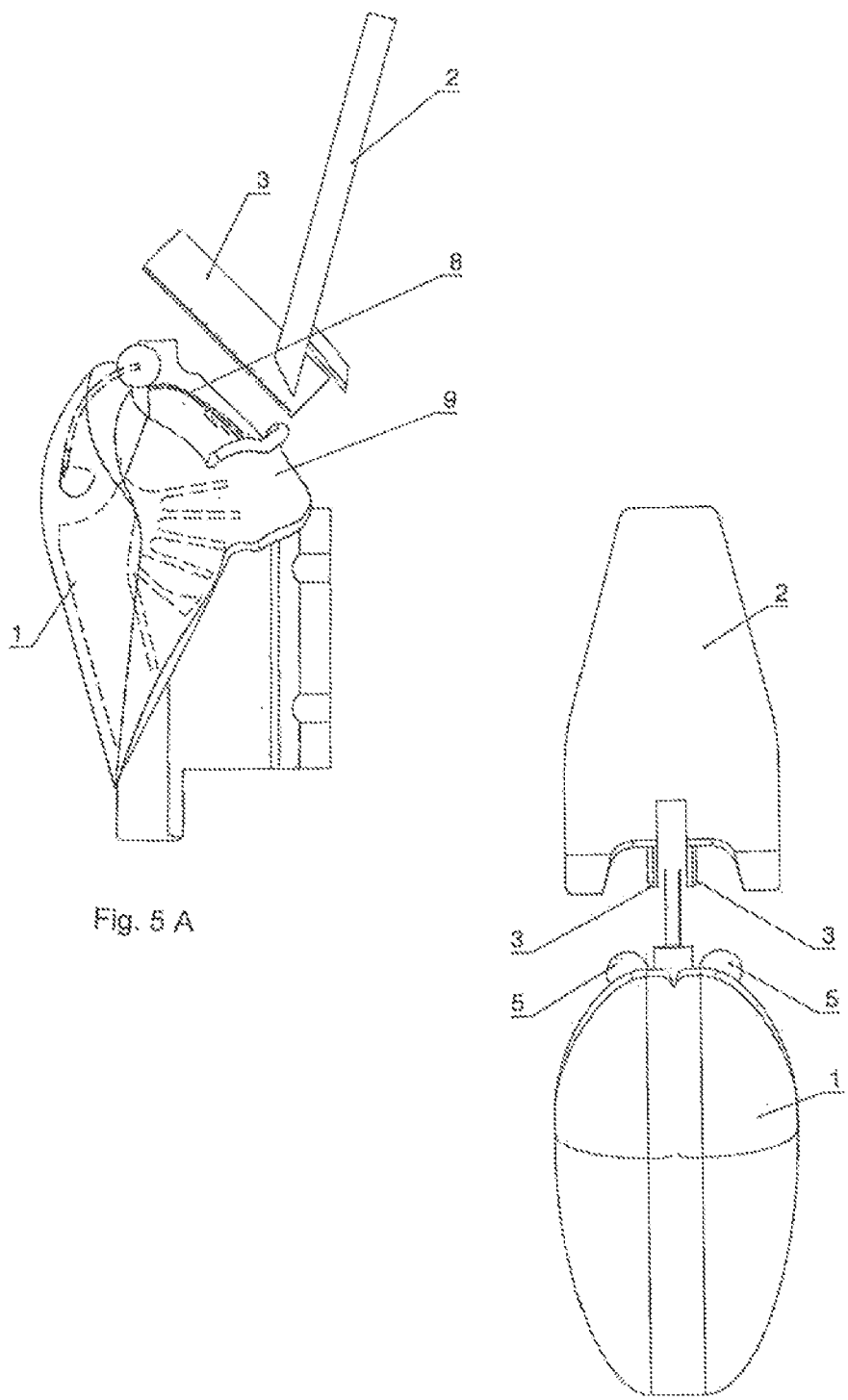
FIG. 5A and FIG. 5B schematically show a fifth step of the exemplary method executed with the exemplary apparatus of the invention in a side and a frontal view respectively.

After completion of the exemplary method step that is shown with reference to FIGS. 3 and 4, or the alternative exemplary step that is shown with reference to FIG. 3 and FIG. 6, FIG. 5A and FIG. 5B show that the scraper 2 and the fixing means 3 can be retracted to release the carcass or carcass part 1 for further processing in which the carcass is filleted.

For proper operation of the apparatus of the invention it is preferable that the fixing means 3 are executed as adjacent fixing plates 3 (see e.g., FIG. 1B and FIG. 2B) that occupy a mutual distance in the region of 7-15 millimeters. This distance is enough to reliably accommodate the backbone of the carcass or carcass part 1 and to ensure that it is appropriately fixed in position when operating on the carcass' neck portion 4 of the backbone. Preferably, each of the plates 3 has rough edges 6 (see FIG. 1A and FIG. 2A) at their sides facing the neck portion 4 of the carcass or carcass part 1.

Figure 7:
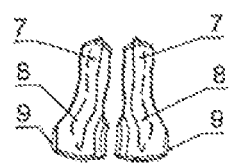
FIG. 7 shows the scapula integral with the backmeat after separation from a carcass or carcass part.
Figure 8:
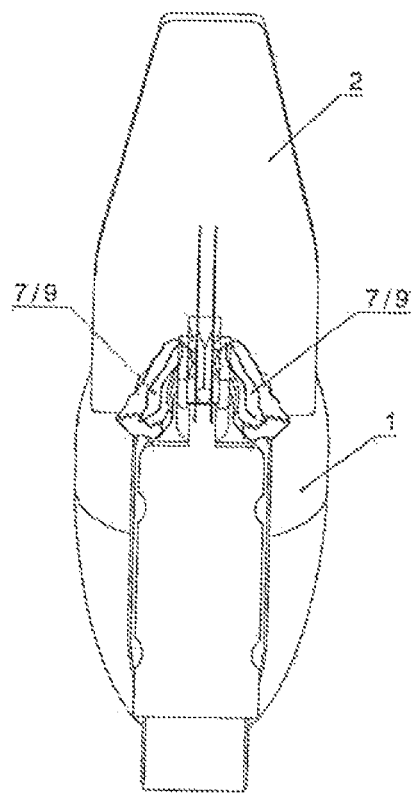
FIG. 8 shows the operation of the apparatus of the invention in a processing step seen from the back.

In FIG. 8, the operation of the scraper 2 is shown from the back side of the carcass or carcass part 1, which demonstrates that the backmeat 9 undergoes a separating action with respect to the carcass or carcass part 1, in particular with respect to its backbone. Depending on the type of operation according to the invention, the connection of the backmeat 9 with the fillets is maintained (see the above description with reference to FIG. 3 and FIG. 4) or is lost (see the above description with reference to FIG. 3 and FIG. 6). In the latter case, a separate chicken product 7 may result as is shown in FIG. 7. This FIG. 7 shows the separated chicken product 7 resulting from the invention, which is an assembly of a scapula 8 (dotted lines) or part of the scapula, integral with backmeat 9 that attaches to the scapula 8 but which is completely separated from the remaining meat of the carcass, which will be separated from the carcass part 1 in the filleting process that follows.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

The invention claimed is:

1. An apparatus for harvesting of backmeat of a carcass or carcass part of slaughtered poultry that includes a backbone, an inside, and an outside, the apparatus comprising:
 a scraper including a forward edge, the forward edge being movable towards and away from the outside of the poultry in a scraping direction of the scraper, the scraper being configured for scraping along both sides of the backbone to scrape backmeat loose from the carcass or carcass part; and
 fixing means movable towards and away from the outside of the poultry and configured to contact the outside of the poultry at a neck portion of the backbone, the fixing means fixing the position of the neck portion during the operation of the scraper, the fixing means comprising a pair of plates arranged adjacent to each other and configured to engage the outside of the poultry at the backbone as the scraper engages the poultry, the plates and scraper also movable relative to each other, the plates each having an edge positioned to face the outside of the poultry at the neck portion.

2. The apparatus for harvesting of backmeat as in claim 1, wherein the forward edge of the scraper comprises an angled edge.

3. The apparatus for harvesting of backmeat as in claim 1, further comprising a conveying device for positioning the carcass or carcass part at the fixing means and scraper, wherein the fixing means and scraper are movable towards and away from the conveying device.

4. The apparatus for harvesting of backmeat as in claim 1, wherein the carcass or carcass part comprises a pair of fillets connected thereto, and wherein the scraper is configured to maintain connection between the fillets and the carcass or carcass part.

5. The apparatus for harvesting of backmeat as in claim 1, wherein the fixing means and the scraper are arranged to operate attuned to each other.

6. The apparatus for harvesting of backmeat as in claim 1, wherein the scraper is arranged to execute a scraping action along the scapula in a region between the scapula and the backbone of the carcass or carcass part, starting from the neck portion of the backbone.

7. The apparatus for harvesting of backmeat as in claim 1, wherein the scraper is arranged to execute scraping of the backmeat along the scapula until the scapula breaks at its corresponding wing joint.

8. The apparatus for harvesting of backmeat as in claim 1, wherein the plates are separated by distance in the range of 7 to 15 millimeters.

9. The apparatus for harvesting of backmeat as in claim 1, wherein the edge of each plate is rough.

10. The apparatus for harvesting of backmeat as in claim 1, wherein the edge of each plate is straight.

11. The apparatus for harvesting of backmeat as in claim 1, wherein the fixing means and scraper are connected together.

12. The apparatus for harvesting of backmeat as in claim 1, wherein the fixing means is configured to receive the neck portion of the backbone at a location between the plates.

13. The apparatus for harvesting of backmeat as in claim 3, wherein the conveying device supports the poultry from the inside.

14. The apparatus for harvesting of backmeat as in claim 1, wherein the plates are configured to engage the outside of the poultry at the neck portion of the backbone such that the position of the neck portion is fixed relative to the plates during the operation of the scraper.

15. The apparatus for harvesting of backmeat as in claim 1, wherein the plates are configured to engage the neck portion of the backbone at a location directly between wing joints of the poultry.

* * * * *